US012629297B2

(12) United States Patent

Pennells et al.

(10) Patent No.: US 12,629,297 B2
(45) Date of Patent: May 19, 2026

(54) METHOD AND DEVICE FOR THE REDUCTION OF HEMORRHAGE

(71) Applicant: Kingfisher Medical Inc., Westerville, OH (US)

(72) Inventors: Simon Eric Pennells, Westerville, OH (US); Colin John Smart, Halifax (GB)

(73) Assignee: KINGFISHER MEDICAL INC., Westerville, OH (US)

( * ) Notice: Subject to any disclaimer, the term of this patent is extended or adjusted under 35 U.S.C. 154(b) by 47 days.

(21) Appl. No.: 18/705,358

(22) PCT Filed: Oct. 26, 2022

(86) PCT No.: PCT/US2022/047937
§ 371 (c)(1),
(2) Date: Apr. 26, 2024

(87) PCT Pub. No.: WO2023/076428
PCT Pub. Date: May 4, 2023

(65) Prior Publication Data
US 2025/0000724 A1 Jan. 2, 2025

Related U.S. Application Data

(60) Provisional application No. 63/273,509, filed on Oct. 29, 2021.

(51) Int. Cl.
*A61G 1/04* (2006.01)
*A47C 27/08* (2006.01)
(Continued)

(52) U.S. Cl.
CPC .............. *A61G 1/04* (2013.01); *A47C 27/082* (2013.01); *A61G 1/048* (2013.01);
(Continued)

(58) Field of Classification Search
CPC . A61G 1/04; A61G 1/048; A61G 7/10; A61G 7/1021; A61G 7/1025;
(Continued)

(56) References Cited

U.S. PATENT DOCUMENTS 3,775,782 A * 12/1973 Rice .......................... A61G 1/00 128/DIG. 20
3,822,425 A * 7/1974 Scales ................ A61G 7/05769 5/699
(Continued)

FOREIGN PATENT DOCUMENTS

EP 4643836 A1 * 11/2025 ............. A61G 7/001
FR 2549366 A1 1/1985
(Continued)

OTHER PUBLICATIONS

European Patent Office; International Search Report & Written Opinion for International Patent Application No. PCT/US22/47937 dated Feb. 2, 2023, 14 Pages.
(Continued)

*Primary Examiner* — Robert G Santos
(74) *Attorney, Agent, or Firm* — Christopher J. Knors; Moore & Van Allen PLLC

(57) ABSTRACT

A method and device of reducing further injury to an injured casualty during transport is described. The method includes the use of a transport device configured with an inflation port and a release valve. The release valve prevents over-pressurization of the device during transport where altitude changes and/or vibration occur, preventing hemorrhaging and pressure injury. A method of reducing pressure injury in the transport of casualties using the transport device is also described.

18 Claims, 5 Drawing Sheets

(51) Int. Cl.
*A47C 27/10* (2006.01)
*A61G 1/048* (2006.01)
*A61G 7/057* (2006.01)
*A61G 7/10* (2006.01)

(52) U.S. Cl.
CPC ....... *A61G 7/05776* (2013.01); *A61G 7/1021* (2013.01); *A47C 27/081* (2013.01); *A47C 27/10* (2013.01); *A61G 7/10* (2013.01)

(58) Field of Classification Search
CPC ................ A61G 7/1026; A61G 7/1028; A61G 7/05769; A61G 7/05776; A61G 2200/32; A61G 2200/327; A47C 27/08; A47C 27/081; A47C 27/082; A47C 27/083; A47C 27/10
USPC ........ 5/625, 627, 81.1 R, 81.1 HS, 706, 710, 5/713, 654, 655.3
See application file for complete search history.

(56) References Cited

U.S. PATENT DOCUMENTS

| | | | | | |
|---|---|---|---|---|---|
| RE28,916 | E * | 7/1976 | Rice | A61G 1/00 | 5/628 |
| 4,024,861 | A * | 5/1977 | Vincent | A61F 5/05883 | 5/628 |
| 4,466,145 | A * | 8/1984 | Jones | A61G 1/00 | 5/628 |
| 4,736,474 | A * | 4/1988 | Moran | A61G 1/007 | 5/628 |
| 4,977,629 | A * | 12/1990 | Jones | A61G 7/001 | 5/632 |
| 5,018,226 | A * | 5/1991 | Davies | A61G 1/00 | 5/81.1 R |
| 5,249,318 | A * | 10/1993 | Loadsman | A47C 27/082 | 5/713 |
| 6,964,073 | B1 * | 11/2005 | Curry | A61G 1/00 | 128/870 |
| 7,007,330 | B2 * | 3/2006 | Kuiper | A61G 7/1021 | 5/733 |
| 7,210,176 | B2 | 5/2007 | Weedling et al. | | |
| 7,337,485 | B2 * | 3/2008 | Metzger | A47C 27/087 | 5/711 |
| 7,583,199 | B2 | 9/2009 | Graebe, Jr. | | |
| 7,712,170 | B2 | 5/2010 | Davis | | |
| 8,782,833 | B2 * | 7/2014 | Beurguet | A62B 31/00 | 5/628 |
| 9,814,642 | B2 | 11/2017 | Purdy et al. | | |
| 11,787,518 | B2 * | 10/2023 | Keesaer | B63C 9/08 | 441/92 |
| 12,364,634 | B2 * | 7/2025 | Calkin | A61G 1/04 | |
| 2002/0133877 | A1 * | 9/2002 | Kuiper | A61G 7/1021 | 5/81.1 R |
| 2002/0144343 | A1 * | 10/2002 | Kuiper | A61G 7/05776 | 5/81.1 R |
| 2007/0044243 | A1 * | 3/2007 | Metzger | A47C 27/087 | 5/710 |
| 2012/0284923 | A1 | 11/2012 | Jensen et al. | | |
| 2012/0291203 | A1 * | 11/2012 | Beurguet | A62B 31/00 | 5/706 |
| 2020/0229610 | A1 | 7/2020 | Wu | | |
| 2021/0024186 | A1 * | 1/2021 | Keesaer | A61G 1/048 | |
| 2024/0082078 | A1 * | 3/2024 | Calkin | A61G 1/013 | |
| 2025/0000724 | A1 * | 1/2025 | Pennells | A61G 1/00 | |
| 2025/0332048 | A1 * | 10/2025 | Lin | A61G 7/0525 | |
| 2026/0000214 | A1 * | 1/2026 | Higgins | A47C 21/026 | |

FOREIGN PATENT DOCUMENTS

| | | | | |
|---|---|---|---|---|
| WO | WO-0245655 | A2 * | 6/2002 | A61G 7/1021 |
| WO | 2005086664 | A2 | 9/2005 | |
| WO | 2017084803 | A1 | 5/2017 | |
| WO | WO-2023076428 | A1 * | 5/2023 | A61G 1/04 |
| WO | WO-2024055024 | A1 * | 3/2024 | A61G 1/04 |

OTHER PUBLICATIONS

The International Bureau of WIPO, International Patent Application No. PCT/US2022/047937, International Preliminary Report on Patentability, May 10, 2024, 8 pages.

* cited by examiner 250
260
265
255
200
L2
270
204
206
W2

METHOD AND DEVICE FOR THE REDUCTION OF HEMORRHAGE

CROSS-REFERENCE TO RELATED APPLICATIONS

This application is a 35 U.S.C. § 371 National Stage Application of International Application No. PCT/US22/47937, filed on Oct. 26, 2022, which claims the benefit of U.S. Provisional Application No. 63/273,509, filed on Oct. 29, 2021, the entirety of each of which is incorporated herein by reference.

TECHNICAL FIELD

This disclosure is directed to a device and method of using the device to reduce or prevent further injury in casualties during transport.

BACKGROUND

Causalities or victims typically are transported out of an area ("extraction"), such as a warzone or disaster area, to an area of safety and/or medical treatment. During such transport there is a significant risk of further injury due to vibrations and/or changes in altitude that occur during transport. Further injury may include hemorrhage and/or pressure injury. The extraction of causalities or victims using inflatable devices is known. However, over-expansion of inflatable devices can pose further injury due during transport, particularly when the transport involves an increase or change in elevation (changes in altitude) such as in aircraft-extraction, as once the inflated device rises about twenty-five feet above sea level, the device will begin to expand.

SUMMARY

In a first embodiment, a method of reducing or preventing further injury to a casualty in need thereof is provided. The method comprises providing a transport device, where the transport device comprises: a top surface; a bottom surface coupled to the top surface defining a length, width, depth, and perimeter; at least two chambers positioned between the top surface and the bottom surface; at least one inflation port in fluid communication with the at least two chambers; and at least one release valve in fluid communication with the at least two chambers. The method further comprises reducing further injury to the casualty during transport.

In one aspect the transport device further comprises a pump configured to couple to the at least one inflation port of the transport device. In another aspect, alone or in combination with any of the previous aspects, the transport device further comprises a plurality of handles about the perimeter.

In one aspect, alone or in combination with any of the previous aspects, each of the top surface and the bottom surface comprise an engineering polymer. In another aspect, alone or in combination with any of the previous aspects, each of the top surface and the bottom surface comprise a coated engineering polymer.

In one aspect, alone or in combination with any of the previous aspects, the at least two chambers are independent of each other. In one aspect, alone or in combination with any of the previous aspects, the at least two chambers are independently inflated. In one aspect, alone or in combination with any of the previous aspects, the release valve prevents the at least two chambers from exceeding a predetermined maximum internal pressure.

In one aspect, alone or in combination with any of the previous aspects, the reducing further injury comprises reducing or preventing pressure injury to the casualty. In another aspect, the reducing further injury comprises reducing or preventing hemorrhage to the casualty In one aspect, alone or in combination with any of the previous aspects, the method further comprises transporting the casualty. In one aspect, the transporting is in a land vehicle, a water vehicle, an aircraft or aerospace vehicle.

In a second embodiment, a transport device is provided. The transport device comprises a top surface; a bottom surface coupled to the top surface defining a length, width, depth, and perimeter; at least two chambers positioned between the top surface and the bottom surface; at least one inflation port in fluid communication with the at least two chambers; and at least one release valve in fluid communication with the at least two chambers.

In another aspect, alone or in combination with any of the previous aspects, each of the top surface and the bottom surface of the transport device are comprised of the same material. In another aspect, alone or in combination with any of the previous aspects, the top surface and the bottom surface are comprised of different material.

In one aspect, each of the top surface and the bottom surface comprises an engineering polymer or a coated engineering polymer. In another aspect, each of the top surface and the bottom surface comprise nylon or nylon coated with thermoplastic polyurethane.

In one aspect, alone or in combination with any of the previous aspects, the at least two chambers are independent of each other. In another aspect, alone or in combination with any of the previous aspects, the at least one inflation port is independently in fluid communication with one of the at least two chambers. In another aspect, alone or in combination with any of the previous aspects, one of the at least one release valve is independently in fluid communication with one of the at least two chambers.

In one aspect, alone or in combination with any of the previous aspects, the transport device further comprises a plurality of handles around the perimeter.

BRIEF DESCRIPTION OF THE DRAWINGS

The present disclosure will now be described, by way of non-limiting examples only, with reference to the accompanying drawings, in which.

DETAILED DESCRIPTION

Figure 1:
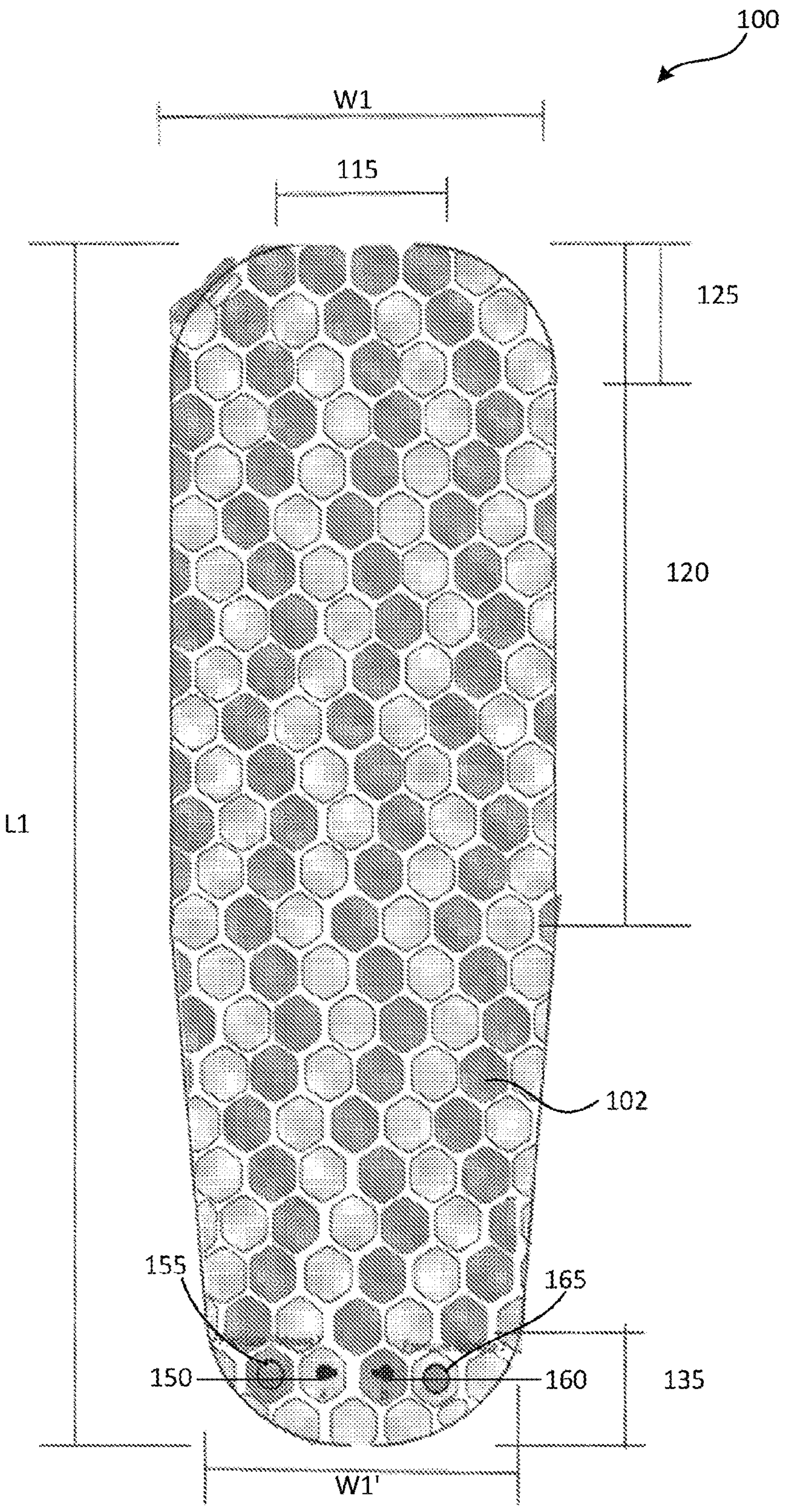
FIG. 1 is a schematic of an exemplary transport device in accordance with an embodiment of the present disclosure.

The present disclosure provides for a transport device and a method of reducing further injury in a casualty in need thereof, by using the transport device. In another example, the present disclosure provides a device and a method for reducing or preventing hemorrhaging in an injured casualty during transport. In yet another example, the present disclosure provides a device and a method for reducing or preventing pressure injury in an injured casualty. At least one object of the present disclosure is to provide a method of reducing injury in a casualty during transport that involves changes in altitude and/or vibrations.

While not be held to any theory, it is believed that the presently disclosed transport device for transporting casualties prevents vibrations caused from transport from disrupting the clotting cascade in the casualty is presented. In one example, the presently disclosed transport device for transporting casualties reduces the pressure between the casualty and the device so as to reduce or prevent pressure injury in the casualty is also presented. The transport device may further provide a thermal insulating function for the casualty. For the purposes of this disclosure, casualty is defined as a mammal who is injured in a war, in an accident, in a disaster, in a mishap, etc.

Transport Device

In one embodiment, the transport device is comprised of a top surface and a bottom surface. In one example, the top surface and bottom surface are the same material. In another example, the top surface and the bottom surface are not the same material. In some examples, the bottom surface is prepared from a material that is more durable to endure transport in a rugged terrain. In one example, the top surface and the bottom surface is prepared from engineering polymers. In one example, the top surface and the bottom surface are prepared from polyamides, such as nylon. In one example, top surface and the bottom surface are prepared from copolyamides. In one example, the top surface and the bottom surface are prepared from polyesters. In one example, the top surface and bottom surface are prepared from copolyesters. In one example, the top surface and the bottom surface are prepared from polypropylene. In one example, the top surface and the bottom surface are prepared from polypropylene copolymers. In one example, the top surface and the bottom surface are prepared from polyethylenes. In one example, the top surface and the bottom surface are prepared from polyethylene copolymers. In one example, the top surface and the bottom surface are prepared from polyphenylenes. In one example, the top surface and the bottom surface are prepared from polyphenylene copolymers. In one example, the top surface and the bottom surface are prepared from polysulfones. In one example, the top surface and the bottom surface are prepared from copolysulfones. In one example, the top surface and the bottom surface are prepared from polyurethanes. In one example, the top surface and the bottom surface are prepared from polyurethane copolymers. In one example, the top surface and the bottom surface are prepared from polyvinylchloride.

In one example, the top surface and the bottom surface are prepared from engineering polymers with coatings. The coatings can be applied via extrusion coating, lamination, or adhesive or ultrasonic bonding. In one example, the top surface and the bottom surface is prepared from coated engineering polymers. In one example, the top and bottom surface are prepared from coated polyamides. In one example, top surface and the bottom surface are prepared from coated copolyamides. In one example, the top surface and the bottom surface are prepared from coated polyesters. In one example, the top surface and bottom surface are prepared from coated copolyesters. In one example, the top surface and the bottom surface are prepared from coated polypropylene. In one example, the top surface and the bottom surface are prepared from coated copolymers of propylene. In one example, the top surface and the bottom surface is prepared from coated polyethylenes. In one example, the top surface and the bottom are prepared from coated copolymers of ethylene. In one example, the top surface and the bottom surface are prepared from polyphenylenes. In one example, the top surface and the bottom surface are prepared from coated polyphenylene copolymers. In one example, the top surface and the bottom surface are prepared from coated polysulfones. In one example, the top surface and the bottom surface are prepared from coated copolysulfones. In one example, the top surface and the bottom surface are prepared from coated polyurethanes. In one example, the top surface and the bottom surface are prepared from coated polyurethane copolymers. In one example, the top surface and the bottom surface are prepared from coated polyvinylchloride.

In one example, the coating is a polymer. In one example, the coating is an engineering polymer. In one example, the coating is a polyamide or copolyimide. In one example, the coating is a polyester or copolyester. In one example, the coating is a polyurethane or copolyurethane. In another example, the coating is a polysulfone or copolysulfone. In one example, the coating is a polyphenylene or polyphenylene copolymers. In one example, the coating is a polyethylene or polyethylene copolymers. In one example, the coating is a polypropylene or polypropylene copolymers. In one example, the coating is polyvinylchloride.

In one example, the transport device is prepared from thermoplastic polyurethane coated nylon, such as RIVERSEAL™ 200HT (Rivertex UK Limited Huntingdon, Cambridgeshire). In one example, the transport device has a weight of 44 dtex. In one example, the transport device has a weight of 78 dtex. In one example, the transport device has a weight of 165 dtex. In one example, the transport device has a weight of 235 dtex. In one example, the transport device has a weight of 470 dtex. In one example, the transport device has a weight of 550 dtex. In one example, the transport device has a weight of 930 dtex. In one example, the transport device has a weight of 1100 dtex. In one example, the transport device is prepared from an OTTERTEX™ (Farmingdale, New York) material. In one example, the transport device is prepared from HYPERD™ 300 (Ripstop By the Roll, LLC Durham, North Carolina). In one example, the transport device is prepared from a PERFECTEX™ (Perfectex Plus LLC Huntington Beach, California) material including industrial fabric or laminated industrial fabric. In one example, the material is thermoplastic polyurethane-coated ultra-high molecular weight polyethylene (UHMWPE). The transport device can be prepared from any engineering polymer, or coated engineering polymer known in the art and is not limited to the examples described herein.

In one example, the transport device is prepared from a material that is water-resistant. For the purposes of this disclosure, the term water resistant is understood to encompass both waterproof and water repellant. In one example, the top surface and the bottom surface is made water-resistant by spraying the surface with a water-resistant chemical. In one example, the transport device is prepared from a water-resistant engineering polymer. In one example, the water-resistant engineering polymer is nylon. In one example, the water-resistant engineering polymer is polyurethane. In one example, the transport device is made water-resistant by coating or treating an engineering polymer with a water-resistant material.

In one example, the transport device is antimicrobial. In one example, the surface is antimicrobial by nature of the material. In one example, the surface is made antimicrobial by coating or treating the surface with an antimicrobial material or composition.

Figure 2:
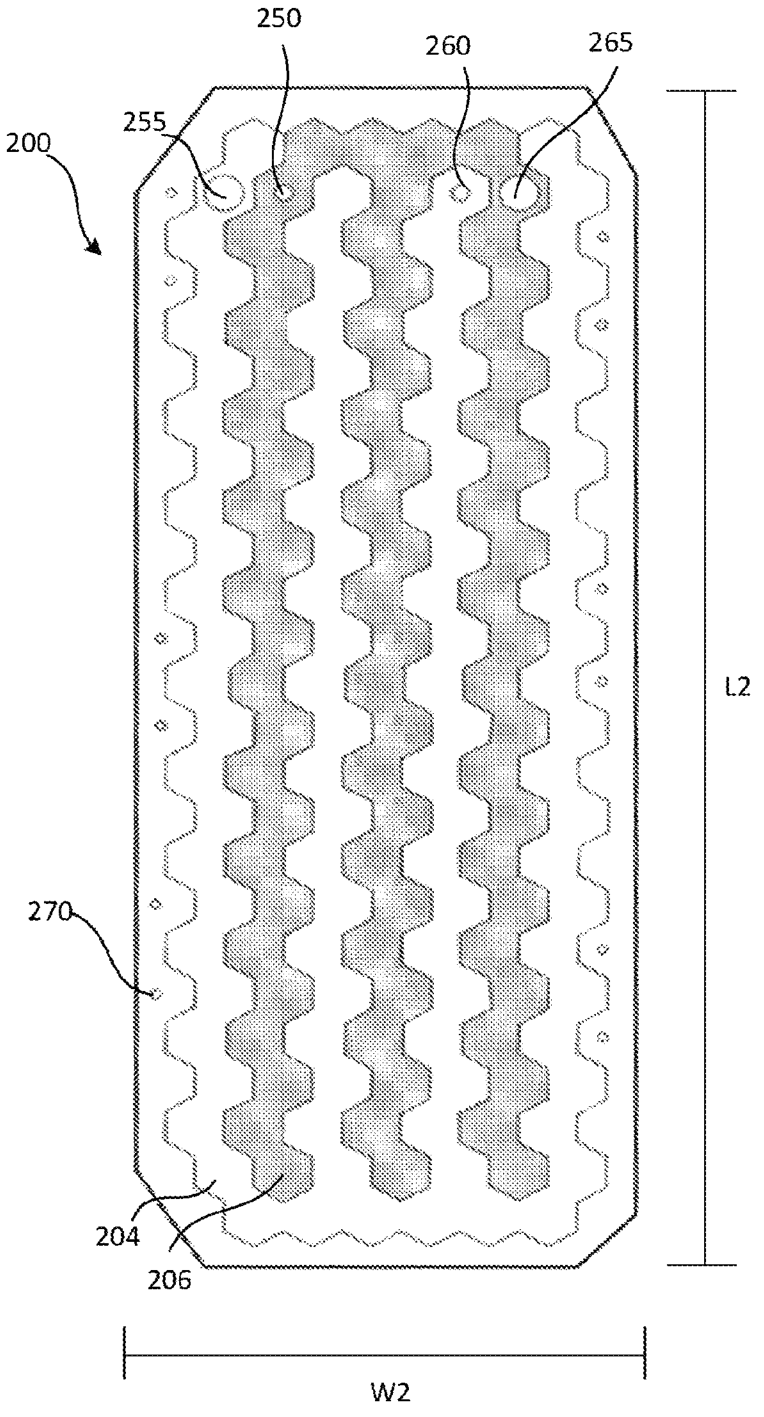
FIG. 2 is a sectional view of through the longitudinal axis of the exemplary transport device shown in FIG. 1 in accordance with an embodiment of the present disclosure.

In one example, the transport device comprises reinforced eyelets 270 around the perimeter, as can be seen in FIG. 2. In one example, handles 510 are sewn through the reinforced eyelets. In one example, the handles are used to secure the transport device to casualty transport platforms. In one example, the handles are used to transport the casualty.

In one example, the transport device is manufactured from two sheets of material. In one example, a first sheet of material comprises strategically placed voids. In one example, a second sheet of material comprises material adjacent to the second sheet of material to form the chambers of the transport device. In one example, the two sheets of material are sewn together. In one example, the two sheets are joined together by sonic or solvent welded adhesive. In one example, the inflation port and the release valve are placed into the voids of the first sheet after the two sheets are joined together. In one example, the inflation port and the release valve are coupled in air-tight arrangement into the voids of the first sheet before the two sheets are joined together. In one example, the inflation port and the release valve are coupled in air-tight arrangement into the voids of the first sheet after the two sheets are joined together. In one example, the inflation port inflates both chambers at the same time with individual pressure control within each chamber. In one example, there are two inflation ports that inflate each chamber independently with individual pressure control.

In one example, the transport device provides thermal insulation to prevent or mitigate hypothermia. In one example, the transport device provides thermal insulation by providing a thermoregulating material within the top surface of the transport device. The thermoregulating material may be any thermoregulating material known in the art. In one example, the thermoregulating material is fleece. In one example, the thermoregulating material is wool. In one example, the thermoregulating material is a phase change material. In one example, the thermoregulating material is a microencapsulated phase change material. In one example, the thermoregulating material is be a knit fabric with a thermoregulating treatment on the surface. In one example, the thermoregulating material is a foil reflective material. In one example, the thermoregulating material is a heat-generating material, wherein when the material is exposed to air heat is generating via chemical reaction(s).

In one example, alone or in combination with the previous examples, the transport device reduces the magnitude or amplitude of vibrations known to disrupt clots and increase bleeding in the casualty. In one example, alone or in combination with any of the previous examples, the transport device alternates pressure between chambers to reduce the casualty-surface interface pressure such that the risk of pressure injury is reduced.

In one example, the chambers are tessellated into cells. In one example, the cells are polygonal shaped. In one example, the cells are four-sided polygon. In one example, the cells are a five-sided polygon, or a heptagon. In one example, the cells are a 6-sided polygon, or a hexagon, as represented by 102 in FIG. 1. In one example, the cells are a 7-sided polygon, or a heptagon. In one example, the cells are an 8-sided polygon, or an octagon. In one example, the cells are a 9-sided polygon, or a nonagon. In one example, other geometric shapes are used. In one example, an array of geometrically shaped cells forms one or more chambers.

As shown in FIG. 2, the presently disclosed transport device 100 has two chambers, a first chamber 204 and a second chamber 206. In one example, the first chamber 204 is isolated from the second chamber 206. In this example, the transport device has a first inflation port 250 and a second inflation port 260. In this example, the transport device has a first release valve 255 and a second release valve 265.

As shown in FIG. 1, the transport device 100 has hexagonal cells 102. In one example, the transport device 100 has a first inflation port 150 and a second inflation port 160. In one example, the transport device 200 comprises a first release valve 155 and a second release valve 165. In one example, the transport device 300 has rectangular cells 302. In one example, the transport device 300 has an inflation port 370 that connects to a first inlet valve of the first chamber 350 and a second inlet valve of the second chamber 360 via a three-way valve 700. In one example, the transport device 300 comprises a first release valve 355 and a second release valve 365.

In one example, the dimensions of the transport device comprise a length and width suitable for transporting a human adult, adolescent, toddler or infant. In one example, the length L2 of the transport device in an inflated state is approximately 86 inches (218.44 cm). In one example, the length L1 or L3 of the transport device in an inflated state is approximately 78 inches (198.12 cm). In one example, alone or in combination with any one of the previous examples, the width W2 of the transport device in an inflated is approximately 27 inches (68.58 cm). In one example, alone or in combination with the previous example, the top width W1 or W3 of the transport device in an inflated is approximately 22 inches (55.88 cm). In another example, alone or in combination with any one of the previous examples, the width W1' or W3' in an inflated state is approximately 12 inches (30.48 cm). In another example, alone or in combination with the previous examples, the depth of the transport device in an inflated state is approximately 2 inches (5.8 cm). In one example, the depth of the transport device in an uninflated state is less than 1 inch (2.54 cm), less than 0.5 inches (1.27 cm), or less than 0.25 inches (0.64 cm).

Figure 3:
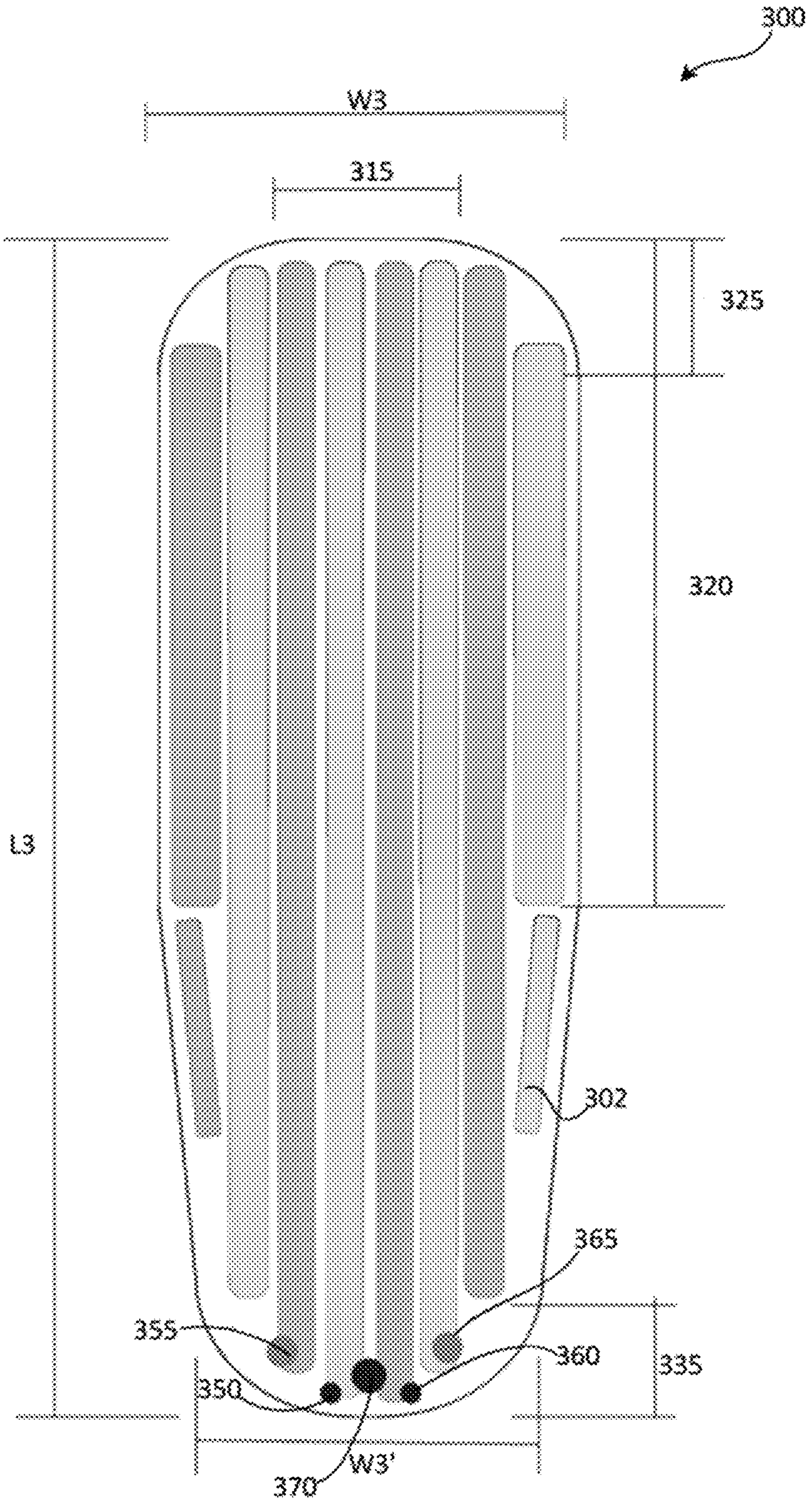
FIG. 3 is a schematic of an exemplary transport device in accordance with an embodiment of the present disclosure.

In one example, the transport device is tapered, as shown in FIG. 1 and FIG. 3. In one example, first tapered length 125 or 325, in an inflated state is approximately 14 inches (35.56 cm). In one example, alone or in combination with any of the previous examples, the second tapered length 120 or 320 in an inflated state is approximately 42 inches (106.7 cm). In one example, alone or in combination with any one of the previous examples, the third tapered length 135 or 335, in an inflated state is approximately 6 inches (15.24 cm). In one example, alone or in combination with any one of the previous examples, the reduced width 115 or 315 in an inflated state is approximately 10 inches (25.4 cm).

Figure 4:
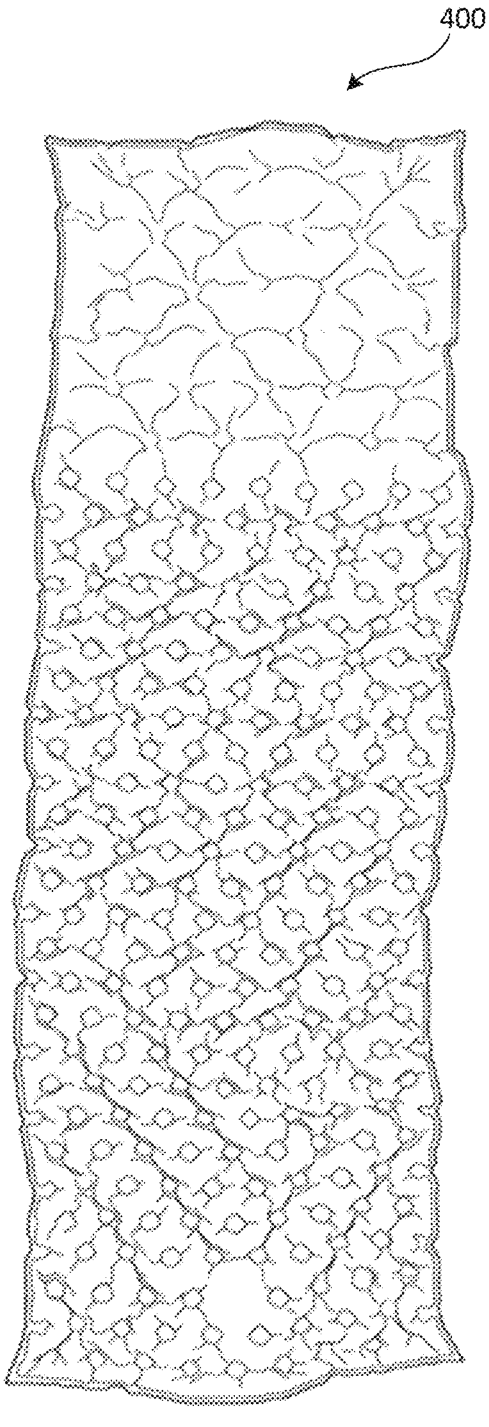
FIG. 4 is a representation of an exemplary transport device in accordance with an embodiment of the present disclosure.
Figure 5:
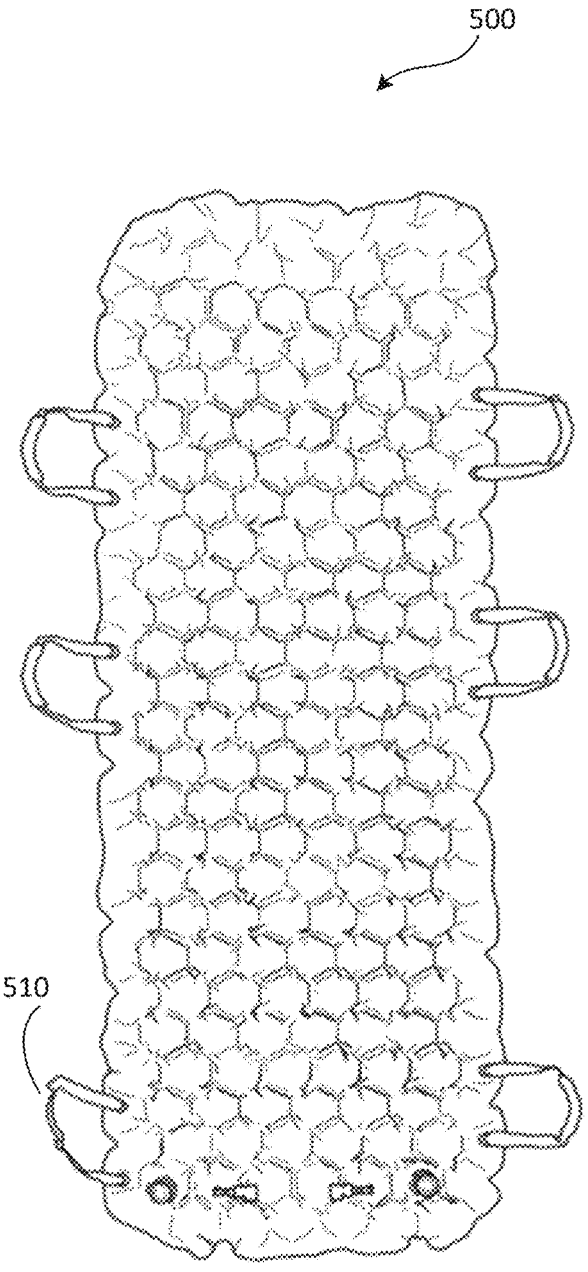
FIG. 5 is a representation of an exemplary transport device in accordance with an embodiment of the present disclosure.

In one example, the transport device is similar to the device 400 in FIG. 4. In one example, the transport device is similar to the device 500 in FIG. 5. In one example, the transport device comprises handles 510. In one example, the transport device has eight handles. In one example, the transport device has six handles. In one example, the transport device has four handles. In one example, the inflation port is configured to be connected to a battery-operated or self-operated pump. In another example, the inflation port is configured to be connected to a mechanically operated pump.

Figure 6:
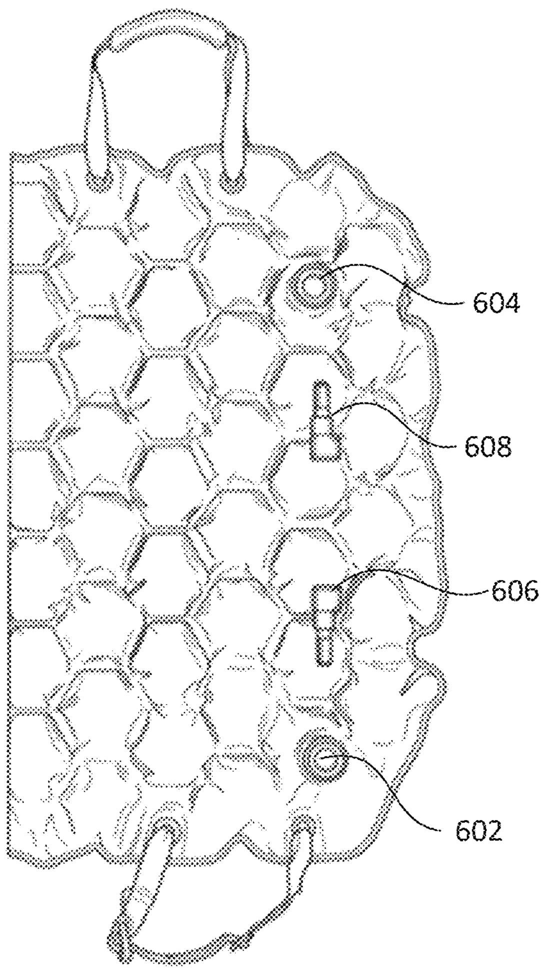
FIG. 6 is a partial view of the exemplary transport device of FIG. 5 in accordance with an embodiment of the present disclosure.
Figure 7:
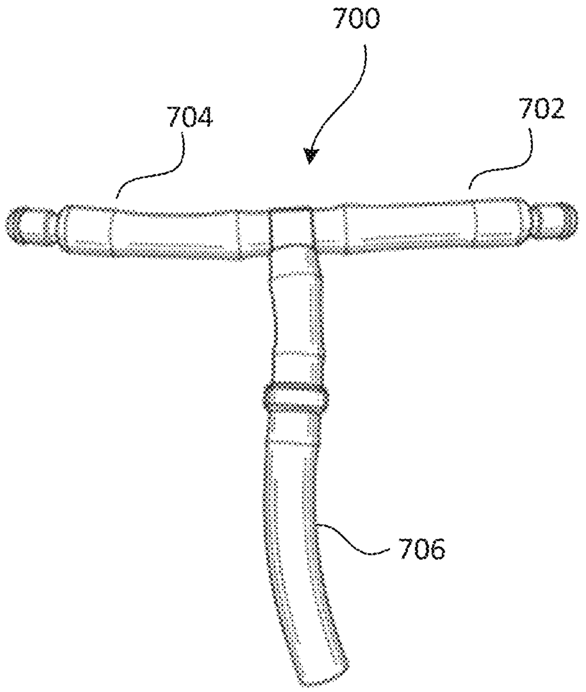
FIG. 7 is a representation of an exemplary three-way inflation port valve in accordance with an embodiment of the present disclosure.

In one example, shown in FIG. 6, the transport device has a first release valve 602, a second release valve 604, a first automatic shut-off inflation port valve 606, and a second automatic shut-off inflation port valve 608. In one example, alone or in combination with any of the previous examples, the inflation port is a three-way valve 700. In one example, the valve is angled for ease of inflation. In one example, the three-way valve is T-shaped, as shown in FIG. 7. In one example, the three-way valve is Y-shaped. In one example, the three-way valve is comprised of an outer connector 706, a first inner connector 702, and a second inner connector 704 to inlet valves of chambers.

The release valve is configured to prevent over-inflation. The release valve mechanically regulates the internal pressure of the chamber; once the pressure within the chamber reaches a predetermined threshold, the release valve will open and remain open until the pressure has been restored to a value lower than the predetermined threshold. In one example, the release valve is a one-way valve. In one example, the release valve is a Scopegra valve (Scopegra spa Milano, Italy). In one example, the release valve is a Scopegra relief valve VA21. In one example, the release valve is a Scopegra relief valve RV 70. In one example, the release valve is a Scopegra relief valve RVG 70. In one example, the release valve is a Scopegra relief valve VA 100. In one example, the release valve is a Scopegra relief valve VA 50. In one example, the release valve is a Scopegra relief valve VA 285. In one example, the release valve is a Scopegra relief valve VA 30. In one example, the release valve is a Scopegra relief valve VA 280. In one example, the release valve is a Scopegra relief valve VA 240. In one example, the release valve is a Scopegra relief valve VA 20. In one example, the release valve is a Scopegra relief valve RV SUP. In one example, the pressure release valve is a HALKEY-ROBERTS™ (Halkey Roberts Corporation St. Petersburg, Florida) valve. In one example, the pressure release valve is a ZODIAC™ (Zodiac Pool Systems LLC Carlsbad, California) pressure relief valve. In one example, the pressure release valve is a ZODIAC™ 6-503-00 relief valve. In one example, the pressure release valve is a Polaris pressure relief valve. In one example, the pressure release valve is a Polaris9-100-9002 relief valve. In one example, the pressure release valve is a LEAFIELD™ (Leafield Marine Limited Wiltshire, England) pressure relief valve. In one example, the pressure release valve is a Lea LEAFIELD™ A6 relief valve. In one example, the pressure release valve is a LEAFIELD™ A9 relief valve. In one example, the pressure release valve is a LEAFIELD™ B10 relief valve. The pressure release valve can be any pressure release valve or pressure relief valve known in the art and is not limited to the examples described herein.

Method of Reducing or Eliminating Further Injury in an Injured Person

The structural relationship between the two chambers and the materials of the transport device absorbs vibrational energy rather than transferring it to the casualty where it can break up blood clots that have formed within the casualty. The release valve releases pressure when the pressure exceeds a predetermined value. This allows the transport device to continue to absorb vibration and reduce hemorrhage when the casualty is being transported at an elevation higher than sea level. In some examples, the casualty is transported via aircraft such as an aerospace vehicle, airplane, or helicopter. In some examples, the casualty is transported by a land vehicle such as a car, a truck, a van, an ambulance, a bus, an animal-drawn sled, etc. In some examples, the casualty is transported by a water vehicle, such as a boat, a ship, or a submarine.

The method of preventing or reducing further injury in casualties includes providing the aforementioned transport device to the casualty, placing the casualty on the top surface of the device, filling the transport device via the inflation port, transporting the casualty, and reducing hemorrhage in the casualty. In one example, the transport device is inflated prior to the casualty being placed on the top surface. In one example the filling of the transport device via the inflation port comprises filling the transport device with a fluid. In one example, the fluid is a gas. In one example, the fluid is a liquid. In one example, the transport device is filled using a mechanical pump. In one example the transport device is filled using a battery-operated or self-powered pump. In one example, the casualty is first transported by foot to a vehicle. In another example, alone or in combination with the previous example, the casualty is transported by vehicle.

In one example, filling the device includes connecting the inflation port to a battery-operated, self-powered pump, or a mechanical pump. In one example, the device is only connected to a pump when there is a need to fill the device.

In one example, the pressure in the chambers of the transport device alternates to promote airflow under the casualty. While not wishing to be bound by any particular theory, promotion of airflow and alternating pressure may prevent pressure injuries. Pressure injuries are injuries to skin and underlying tissue resulting from prolonged pressure. In one example, the pressure injury prevented is decubitus ulcer(s). In one example, the pressure injury prevented is pressure ulcer(s). In one example, the pressure injury prevented is pressure sore(s). In one example, the pressure injury prevented is pressure lesion(s). In one example, the pressure injury prevented is bed sore(s). In one example, the pressure injury prevented is occipital alopecia. The pressure injury can be any pressure related illness or injury known in the field and is not limited to the examples described herein.

In one example, where there are two independent chambers in the device, the pressure will alternate between the two chambers. This process may require the device to be connected to a pump and each chamber filled to a first predetermined pressure. First, one chamber will release pressure via the release valve until a second predetermined pressure is reached. After a prescribed period of time, the pump will fill the one chamber to the first predetermined pressure, and the other chamber will release pressure via the release valve to the second predetermined pressure. This process may continue for an extended period of time. In one example, this process is automated. In another example, this process is manually controlled.

While certain embodiments of the present disclosure have been illustrated with reference to specific combinations of elements, various other combinations may also be provided without departing from the teachings of the present disclosure. Thus, the present disclosure should not be construed as being limited to the particular exemplary embodiments described herein and illustrated in the Figures. The present disclosure may also encompass combinations of elements of the various illustrated embodiments and aspects thereof.

We claim:

1. A method of reducing or preventing further injury during transport to a casualty in need thereof, the method comprising:

providing a transport device comprising:

a top surface;

a bottom surface coupled to the top surface defining a length, width, depth, and perimeter;

at least two chambers positioned between the top surface and the bottom surface and extending substantially from the top surface to the bottom surface;

at least one inflation port in fluid communication with the at least two chambers;

at least one release valve in fluid communication with the at least two chambers;

the at least two chambers being independently inflatable of each other, and the at least two chambers having individual pressure control;

wherein the pressure in the at least two chambers alternates to reduce casualty-surface interface pressure; and reducing further hemorrhage to a casualty during transport.

2. The method of claim 1, the transport device further comprises a pump configured to couple to the at least one inflation port of the transport device.

3. The method of claim 1, wherein the transport device further comprises a plurality of handles about the perimeter.

4. The method of claim 1, wherein each of the top surface and the bottom surface comprise an engineering polymer.

5. The method of claim 1, wherein each of the top surface and the bottom surface comprise a coated engineering polymer.

6. The method of claim 1, wherein the at least one release valve prevents the at least two chambers from exceeding a predetermined maximum internal pressure.

7. The method of claim 1, wherein the reducing further injury comprises reducing or preventing pressure injury to the casualty.

8. The method of claim 1, further comprising transporting the casualty.

9. The method of claim 8, wherein the transporting is by a land vehicle, a water vehicle, an aircraft or aerospace vehicle.

10. A transport device comprising:

a top surface;

a bottom surface coupled to the top surface defining a length, width, depth, and perimeter;

at least two chambers positioned between the top surface and the bottom surface and extending substantially from the top surface to the bottom surface;

at least one inflation port in fluid communication with the at least two chambers; and at least one release valve in fluid communication with the at least two chambers;

the at least two chambers configured to be independently inflatable of each other, and the at least two chambers have individual pressure control;

wherein the pressure in the at least two chambers is configured to alternatively reduce casualty-surface interface pressure.

11. The transport device of claim 10, wherein each of the top surface and the bottom surface of the transport device are comprised of the same material.

12. The transport device of claim 10, wherein the top surface and the bottom surface are comprised of different material.

13. The transport device of claim 10, wherein each of the top surface and the bottom surface comprises an engineering polymer or a coated engineering polymer.

14. The transport device of claim 10, wherein each of the top surface and the bottom surface comprise nylon or nylon coated with thermoplastic polyurethane.

15. The transport device of claim 10, wherein the at least two chambers are independent of each other.

16. The transport device of claim 15, wherein each of the at least two chambers are tessellated into geometrically shaped cells.

17. The transport device of claim 15, wherein each of the at least two chambers extend parallel along the length.

18. The transport device of claim 10, wherein the transport device further comprises a plurality of handles around the perimeter.

* * * * *